US012126118B2

(12) United States Patent
Ito

(10) Patent No.: US 12,126,118 B2
(45) Date of Patent: Oct. 22, 2024

(54) CONNECTOR WITH BENT PIECE SUCH THAT THE BENT PIECE CAN BLOCK FITTING OF THE PARTNER CONNECTOR BY A BENT PIECE SURFACE FORMING THE TIP END PORTION, AND THEREFORE PREVENT ERRONEOUS INSERTION

(71) Applicant: HIROSE ELECTRIC CO., LTD., Kanagawa (JP)

(72) Inventor: Takeshi Ito, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 362 days.

(21) Appl. No.: 17/682,405

(22) Filed: Feb. 28, 2022

(65) Prior Publication Data

US 2022/0285883 A1 Sep. 8, 2022

(30) Foreign Application Priority Data

Mar. 3, 2021 (JP) ................................ 2021-033332

(51) Int. Cl.
*H01R 13/64* (2006.01)
*H01R 13/631* (2006.01)

(52) U.S. Cl.
CPC ........... *H01R 13/64* (2013.01); *H01R 13/631* (2013.01)

(58) Field of Classification Search
CPC .............................. H01R 13/64; H01R 13/631

(Continued)

(56) References Cited

U.S. PATENT DOCUMENTS 6,000,968 A * 12/1999 Hagiwara ............ H01R 12/714 439/607.01
6,375,505 B1 * 4/2002 Lin ........................ H01R 12/00 439/607.37

(Continued)

FOREIGN PATENT DOCUMENTS

JP 2002-246114 A 8/2002
JP 2006048948 A 2/2006

(Continued)

OTHER PUBLICATIONS

Extended European Search Report (EESR) dated Jul. 19, 2022 for European Patent Application No. 22157985.7.

(Continued)

*Primary Examiner* — Peter G Leigh
(74) *Attorney, Agent, or Firm* — RANKIN, HILL & CLARK LLP

(57) ABSTRACT

An electric connector includes: a housing having a plate-shaped body; multiple terminals held on the plate-shaped body; and a metal shell surrounding the plate-shaped body and the terminals and having a tubular shape, the shell has: a fitting port in which a partner connector is to be fitted; two or more side walls provided along a partner connector fitting direction; a coupling portion coupling adjacent ones of the two or more side walls; and a first branched band-shaped piece provided closer to a fitting port side than the coupling portion is to the fitting port side, the first branched band-shaped piece is bent about an axis along the fitting direction from one of the adjacent ones of the two or more side walls, and extends toward another one of the adjacent ones of the two or more side walls, and an edge of the first branched band-shaped piece opposite to the coupling portion forms part of the fitting port.

7 Claims, 7 Drawing Sheets

(58) Field of Classification Search
USPC .......................................................... 439/374
See application file for complete search history.

(56) References Cited

U.S. PATENT DOCUMENTS

| | | | | | |
|---|---|---|---|---|---|
| 10,505,288 | B2 * | 12/2019 | Naganuma | ............. | H01R 24/60 |
| 11,362,455 | B2 | 6/2022 | Sakoda | | |
| 2006/0063432 | A1 * | 3/2006 | Chen | .................... | H01R 13/658<br>439/607.36 |
| 2012/0231675 | A1 * | 9/2012 | Zhang | .................. | H01R 12/724<br>439/682 |
| 2018/0175561 | A1 * | 6/2018 | Chen | ...................... | H01R 12/52 |
| 2019/0237898 | A1 * | 8/2019 | Naganuma | ............. | H01R 13/56 |
| 2021/0013689 | A1 * | 1/2021 | Sakoda | .............. | H01R 13/6586 |
| 2021/0257769 | A1 * | 8/2021 | Sakoda | ................ | H01R 12/716 |

FOREIGN PATENT DOCUMENTS

| | | | | | |
|---|---|---|---|---|---|
| JP | 2012064340 | A | 3/2012 | | |
| JP | 2017-152310 | A | 8/2017 | | |
| WO | WO-2019167525 | A1 * | 9/2019 | ........... | H01R 13/405 |
| WO | WO-2020004076 | A1 * | 1/2020 | ........... | H01R 12/716 |

OTHER PUBLICATIONS

Japanese Office Action (JPOA) dated Apr. 4, 2024, for the corresponding Japanese Patent Application No. 2021-033332; English machine translation.

* cited by examiner

CONNECTOR WITH BENT PIECE SUCH THAT THE BENT PIECE CAN BLOCK FITTING OF THE PARTNER CONNECTOR BY A BENT PIECE SURFACE FORMING THE TIP END PORTION, AND THEREFORE PREVENT ERRONEOUS INSERTION

CROSS-REFERENCE TO RELATED APPLICATION

This application claims priority from Japanese Patent Application No. 2021-033332 filed with the Japan Patent Office on Mar. 3, 2021, the entire content of which is hereby incorporated by reference.

BACKGROUND

1. Technical Field

One aspect of the present disclosure relates to an electric connector.

2. Related Art

For reducing erroneous insertion of a partner connector into a connector, it has been known that fitting ports for fitting these connectors have characteristic shapes (see, e.g., JP-A-2002-246114). Since the fitting ports have the characteristic shapes as described above, it is difficult to fit the connectors in each other in a case where the shapes of the fitting ports of these connectors do not match each other. With this configuration, damage or breakage of a connector terminal due to forcible insertion can be reduced.

As the method in which the fitting ports have the characteristic shapes, a technique in which a bent piece is provided at an edge of a fitting port of a shell of a connector to form an asymmetrical shape of the fitting port has been known (see, e.g., JP-A-2017-152310).

SUMMARY

An electric connector includes: a housing having a plate-shaped body; multiple terminals held on the plate-shaped body; and a metal shell surrounding the plate-shaped body and the terminals and having a tubular shape. The shell has: a fitting port in which a partner connector is to be fitted; two or more side walls provided along a partner connector fitting direction; a coupling portion coupling adjacent ones of the two or more side walls; and a first branched band-shaped piece provided closer to a fitting port side than the coupling portion is to the fitting port side. The first branched band-shaped piece is bent about an axis along the fitting direction from one of the adjacent ones of the two or more side walls, and extends toward another one of the adjacent ones of the two or more side walls, and an edge of the first branched band-shaped piece opposite to the coupling portion forms part of the fitting port.

DETAILED DESCRIPTION

Figure 1:
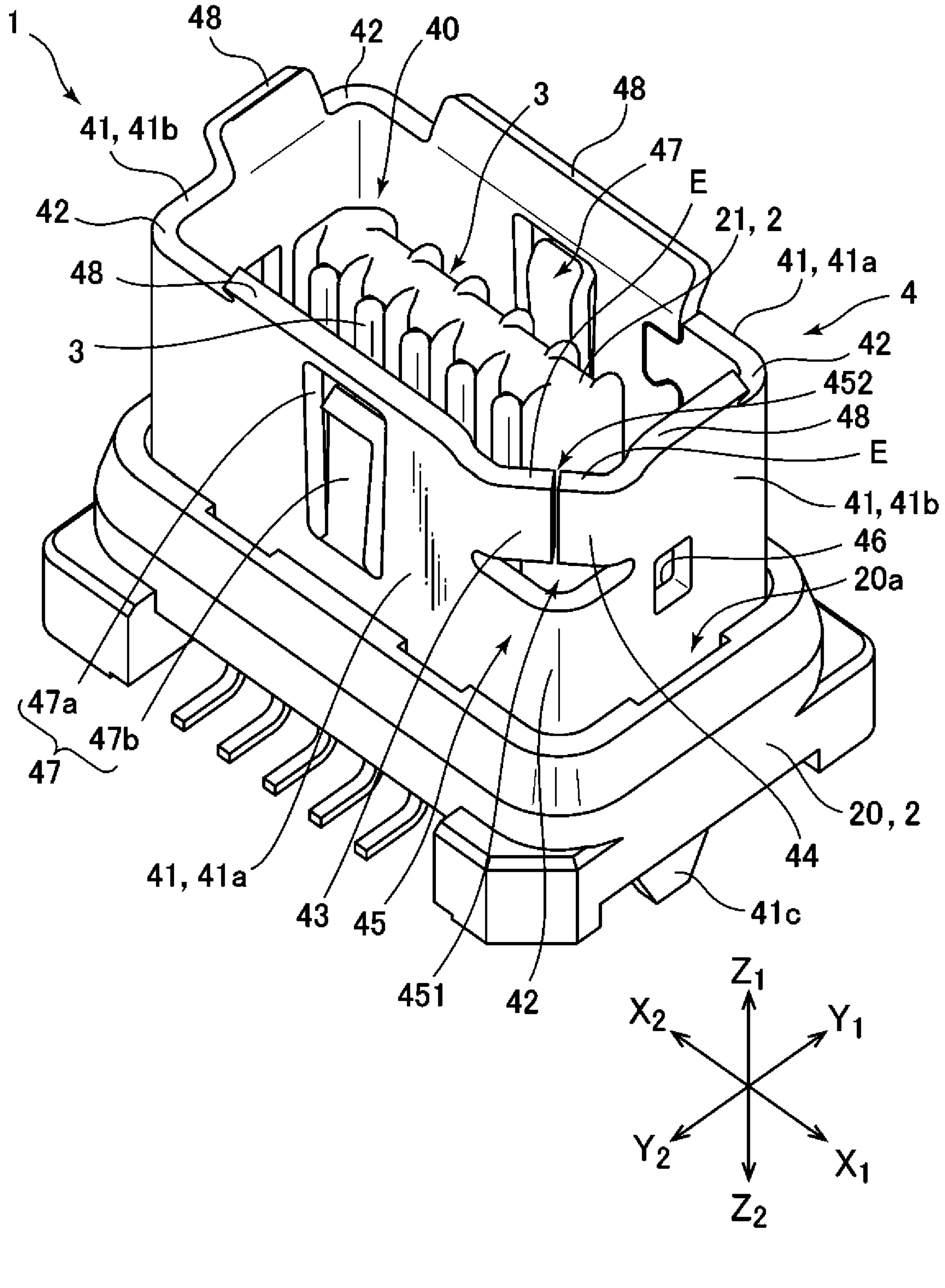
FIG. 1 is a front perspective view of an electric connector according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The above-described bent piece stands in a connector fitting direction on the shell edge forming the fitting port, and is bent such that a tip end portion thereof is perpendicular to the fitting direction. Thus, in a case where the shape or orientation of the fitting port of the partner connector does not match the bent piece, the bent piece can block fitting of the partner connector by a bent piece surface forming the tip end portion, and therefore, erroneous insertion can be reduced.

However, the partner connector is received by the surface of the tip end portion of the above-described bent piece. For this reason, the bent piece itself is easily deformable, and the shell is also deformable by force on the bent piece.

One object of the present disclosure is to provide an electric connector capable of reducing erroneous insertion of a partner connector and reducing deformation of a shell.

An electric connector according to one aspect of the present disclosure includes: a housing having a plate-shaped body; multiple terminals held on the plate-shaped body; and a metal shell surrounding the plate-shaped body and the terminals and having a tubular shape. The shell has: a fitting port in which a partner connector is to be fitted; two or more side walls provided along a partner connector fitting direction; a coupling portion coupling adjacent ones of the two or more side walls; and a first branched band-shaped piece provided closer to a fitting port side than the coupling portion is to the fitting port side. The first branched band-shaped piece is bent about an axis along the fitting direction from one of the adjacent ones of the two or more side walls, and extends toward another one of the adjacent ones of the two or more side walls, and an edge of the first branched band-shaped piece opposite to the coupling portion forms part of the fitting port.

According to one aspect of the present disclosure, the electric connector capable of reducing erroneous insertion of the partner connector and reducing deformation of the shell can be provided.

EMBODIMENT

Configuration

Figure 2:
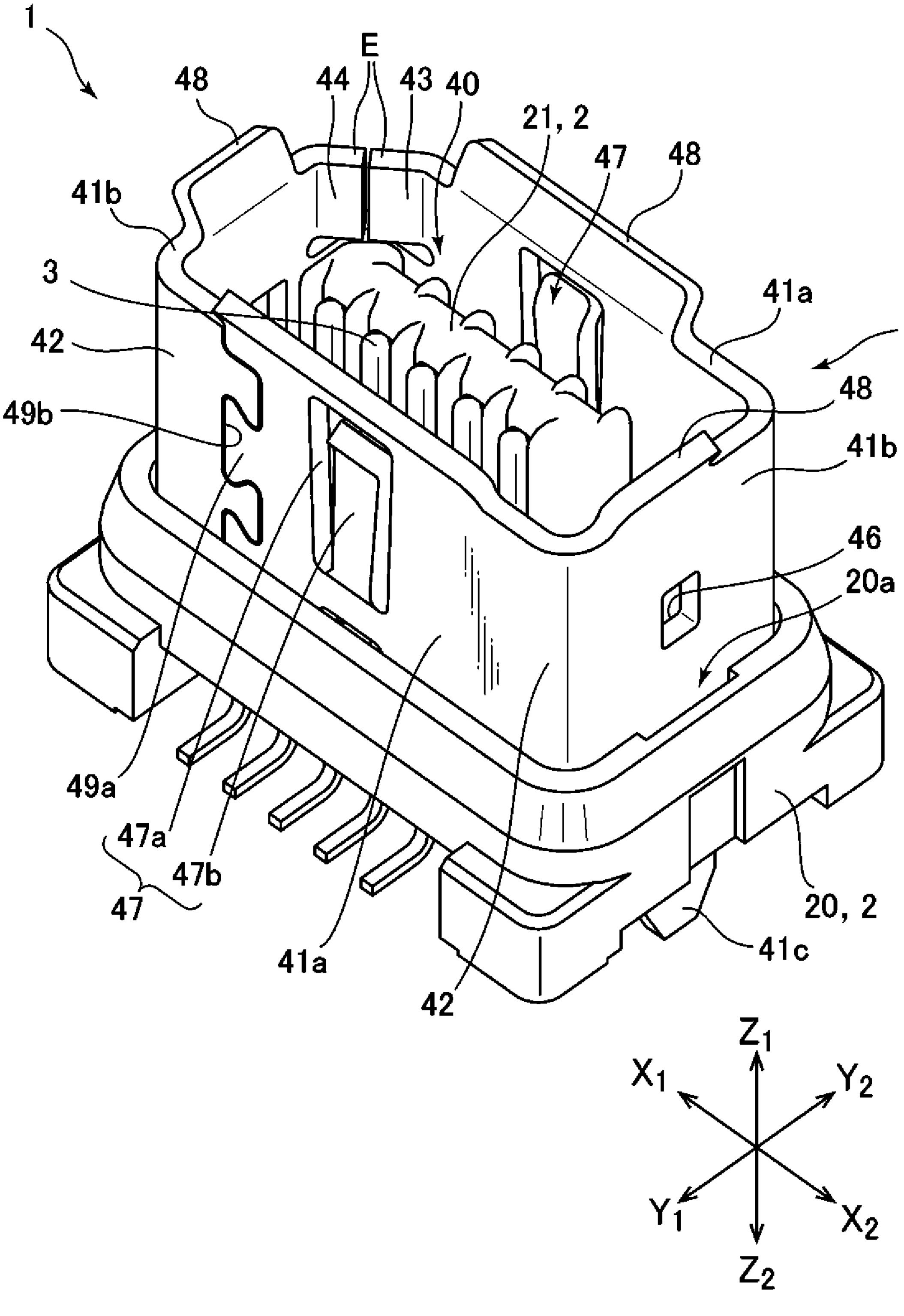
FIG. 2 is a back perspective view of the electric connector according to the embodiment.
Figure 3:
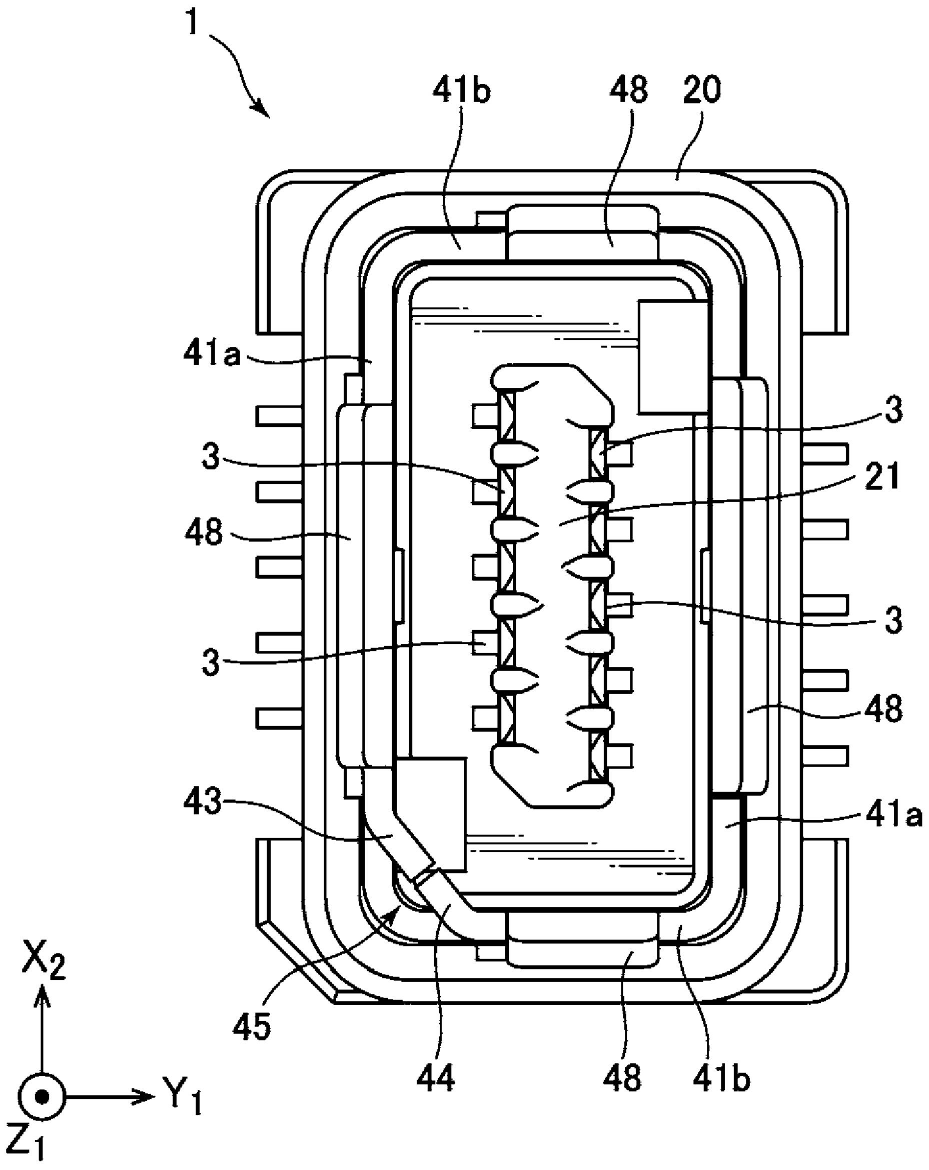
FIG. 3 is a top view of the electric connector according to the embodiment.

FIG. 1 is a front perspective view of an electric connector according to the present embodiment. FIG. 2 is a back perspective view of the electric connector according to the present embodiment. FIG. 3 is a top view of the electric connector according to the present embodiment.

For the sake of convenience in description of the embodiment below, a longitudinal direction (a terminal array direction) of the electric connector 1 is taken as an X-direction (an X1X2 direction), a lateral direction (a terminal facing direction) is taken as a Y-direction (a Y1Y2 direction), and a height direction (a fitting/removal direction) is taken as a Z-direction (a Z1Z2 direction). The Z2 direction is a fitting direction, and the Z1 direction is a removal direction. Note that each direction is for describing a relative positional relationship among portions forming the electric connector and does not indicate a precise direction. In the height direction, a side relatively on the Z1 side will be sometimes referred to as "above," an "upper side," or "upper," and a side relatively on the Z2 side will be sometimes referred to as "below," a "lower side," "lower," or a "bottom side."

The electric connector 1 described herein is a receptacle connector mounted on a not-shown substrate. The electric connector 1 includes a housing 2, multiple terminals 3, and a metal shell 4. The electric connector 1 and a not-shown partner connector are electrically connected to each other in such a manner that the partner connector is fitted in the shell 4 through a fitting port 40 thereof and the multiple terminals 3 held on the housing 2 and terminals of the partner connector contact each other in the shell 4. Note that the electric connector 1 of the present embodiment is configured such that the fitting direction is substantially perpendicular to the substrate. Note that the fitting direction may be substantially horizontal to the substrate.

The housing 2 is, for example, made of resin, and has a base 20 and a plate-shaped body 21. The base 20 is a mount placed on the substrate and having a flat substantially-rectangular parallelepiped shape. The base 20 described herein is formed with a step in the upper-lower direction. The plate-shaped body 21 is in a plate shape, and stands to upwardly (the Z1 direction) extend from the base 20 in a state in which the surface of the plate-shaped body 21 is perpendicular to the Y-direction. The multiple terminals 3 are arrayed on both surfaces of the plate-shaped body 21. In this example, five terminals 3 are arrayed on one surface of the plate-shaped body 21, and five terminals 3 are arrayed on the other surface.

The terminal 3 is a conductor to be electrically connected to the terminal of the partner connector by contacting the terminal of the partner connector and to be electrically connected to a circuit on the substrate. The terminals 3 are held on the housing 2. For example, the terminal 3 has a substantially L-shape such that one side of the L-shape is held on the plate-shaped body 21 and the other side is exposed through a lower portion of the base 20, extends in the Y-direction, and is electrically connected to the circuit on the substrate. That is, one side of the L-shape is a contact portion configured to contact the terminal of the partner connector, and the other side of the L-shape is a mounting portion to be mounted on the substrate. The terminal 3 may be, for example, held on the plate-shaped body 21 in such a manner that the terminal 3 is attached to a hole of the plate-shaped body 21 by, e.g., press-fitting, or may be held on the plate-shaped body 21 in such a manner that part of the terminal 3 is embedded in the plate-shaped body 21 by, e.g., insert molding. The multiple terminals 3 are arrayed in the X-direction to form first and second terminal arrays. The first terminal array in the Y2 side and the second terminal array on the Y1 side face each other in the Y-direction with the plate-shaped body 21 being interposed therebetween. Note that in the present embodiment, the multiple terminals 3 are arranged in a zigzag pattern such that each terminal 3 of the terminal array on one side is positioned between adjacent ones of the terminals 3 of the terminal array on the other side, considering reduction in crosstalk.

The shell 4 is a metal member surrounding the plate-shaped body 21 and the terminals 3 and having a tubular shape. The shell 4 has the fitting port 40, two or more side walls 41, coupling portions 42, a first branched band-shaped piece 43, a second branched band-shaped piece 44, a cutout portion 45, lock holes 46, claw portions 47, and guide pieces 48.

The fitting port 40 is an opening in which the partner connector is to be fitted. The fitting port 40 serves as an inlet of the shell 4 when the partner connector is fitted, and serves as an outlet of the shell 4 when the partner connector is removed. That is, the fitting port 40 is positioned at an upper portion of the electric connector 1, specifically a portion above an upper edge of the plate-shaped body 21. The fitting port 40 of the present embodiment has a pentagonal shape formed by cutting out of one corner of a rectangular shape, and has an asymmetrical shape in the X-direction and the Y-direction.

The two or more side walls 41 are four side walls 41 in this example, and in a rectangular tubular shape, surround the plate-shaped body 21. The side walls 41 surround the plate-shaped body 21 along the Z2 direction which is the fitting direction. Specifically, the side walls 41 include a pair of side walls 41*a* provided parallel with the ZX plane and a pair of side walls 41*b* connecting end portions of the side walls 41*a* and provided parallel with the ZY plane. The pair of side walls 41*a* and the pair of side walls 41*b* surround the plate-shaped body 21. That is, the side wall 41*a* on the Y2 side is adjacent to the side wall 41*b* on the X1 side in the X1 direction, and is adjacent to the side wall 41*b* on the X2 side in the X2 direction. The side wall 41*a* on the Y1 side is adjacent to the side wall 41*b* on the X1 side in the X1 direction, and is adjacent to the side wall 41*b* on the X2 side in the X2 direction. A shell of the partner connector is fitted in an internal space among the four side walls 41 and the plate-shaped body 21. Note that a phrase "along the fitting direction" means parallel or substantially parallel with the fitting direction. A phrase "substantially parallel with the fitting direction" means, in one example, a direction at an angle of −5° to 5° with respect to the fitting direction.

A pair of fixing pieces 41*c* extending downwardly is provided at lower ends of the side walls 41*b*. The fixing pieces 41*c* are press-fitted in a pair of holes 20*a* of the base 20, and accordingly, the shell 4 is fixed to stand on the base 20. Moreover, lower ends of the fixing pieces 41*c* are exposed through the base 20 so that the fixing pieces 41*c* can be electrically connected to the circuit on the substrate.

The coupling portion 42 is a portion coupling adjacent ones 41*a*, 41*b* of the two or more side walls 41. In this example, the coupling portions 42 are provided at four corners of the shell 4. For example, the coupling portion 42 couples, at least at one or more corner portions of the shell 4, the side walls 41*a*, 41*b* adjacent to each other at a position lower than the height of the center of the side wall 41. At each of the remaining corner portions, the coupling portion 42 couples, across the upper-lower direction, the side walls 41*a*, 41*b* adjacent to each other.

Figure 4:
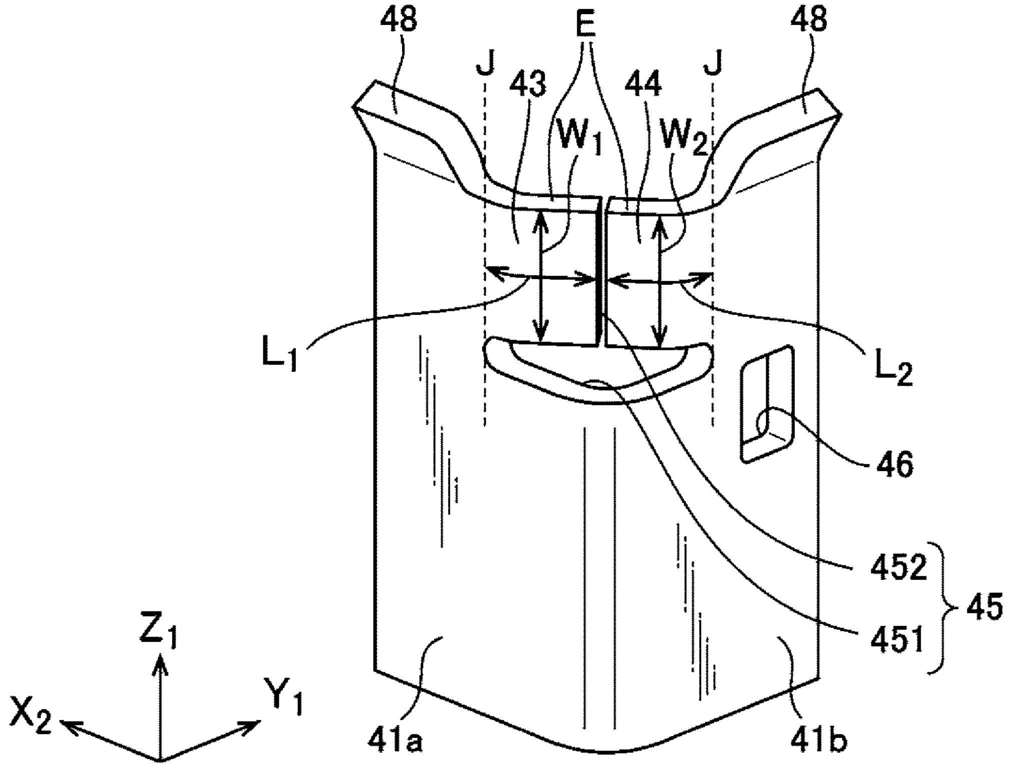
FIG. 4 is a partially-enlarged view of one corner portion of a shell provided with first and second branched band-shaped pieces, as viewed from the outside of the shell.
Figure 5:
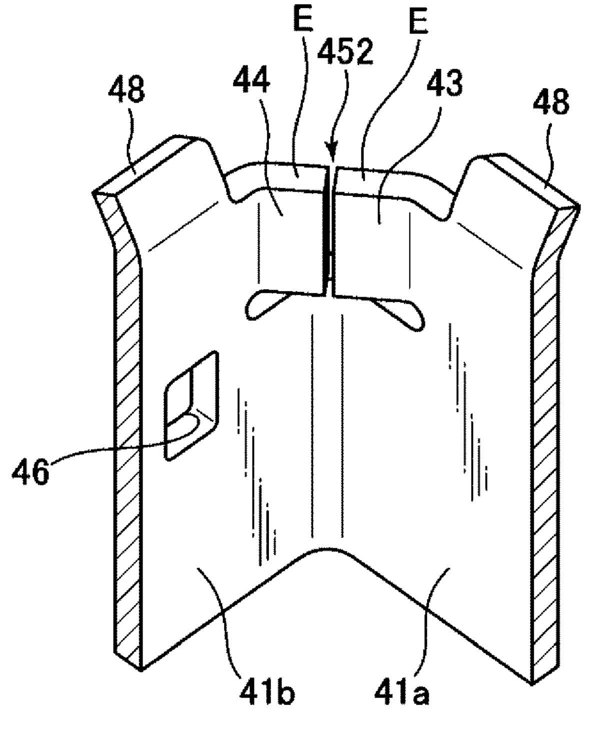
FIG. 5 is a partially-enlarged view of one corner portion of the shell provided with the first and second branched band-shaped pieces, as viewed from the inside of the shell.

FIG. 4 is a partially-enlarged view of one corner portion of the shell 4 provided with the branched band-shaped pieces 43, 44, as viewed from the outside of the shell 4. FIG. 5 is a partially-enlarged view of one corner portion of the shell 4 provided with the branched band-shaped pieces 43, 44, as viewed from the inside of the shell 4.

As shown in FIGS. 1, 2, 4, and 5, the first branched band-shaped piece 43 and the second branched band-shaped piece 44 are band-shaped bodies provided on a fitting port 40 side with respect to the coupling portion 42 and branched from the side walls 41. The first branched band-shaped piece 43 is bent about an axis J along the fitting direction from one 41*a* of the side walls 41*a*, 41*b* adjacent to each other, and extends toward the other one 41*b* of the side walls 41*a*, 41*b* adjacent to each other. The axis J is parallel or substantially parallel with the fitting direction. The second branched band-shaped piece 44 is bent about the axis J along the fitting direction from the other one 41*b* of the side walls 41*a*, 41*b* adjacent to each other, and extends toward one 41*a* of the side walls 41*a*, 41*b* adjacent to each other. Edges E of the first branched band-shaped piece 43 and the second branched band-shaped piece 44 on the side opposite to the coupling portion 42 form part of the fitting port 40. That is, each of the branched band-shaped pieces 43, 44 forms the asymmetrical shape of the fitting port 40. A clearance between a tip end of the first branched band-shaped piece 43 and a tip end of the second branched band-shaped piece 44 is equal to or smaller than the thickness of the first branched band-shaped piece 43 or the second branched band-shaped piece 44.

The width W1 of the first branched band-shaped piece 43, i.e., the length of the first branched band-shaped piece 43 in the fitting direction, is equal to or greater than the length L1 of the first branched band-shaped piece 43 extending from one side wall 41*a* to the other side wall 41*b* (W1/L1≥1). The width W1 of the first branched band-shaped piece 43, i.e., the length of the first branched band-shaped piece 43 in the fitting direction, is greater than the thickness of the first branched band-shaped piece 43. Note that a thickness direction is a direction perpendicular to the direction of the width W1 and the direction of the length L1 and the thickness is equal or substantially equal to that of the side wall 41*a*.

The width W2 of the second branched band-shaped piece 44, i.e., the length of the second branched band-shaped piece 44 in the fitting direction, is equal to or greater than the length L2 of the second branched band-shaped piece 44 extending from the other side wall 41*b* to one side wall 41*a* (W2/L2≥1). The width W2 of the second branched band-shaped piece 44, i.e., the length of the second branched band-shaped piece 44 in the fitting direction, is greater than the thickness of the second branched band-shaped piece 44. Note that a thickness direction is a direction perpendicular to the direction of the width W2 and the direction of the length L2 and the thickness is equal or substantially equal to that of the side wall 41*b*.

As long as deformation of the first branched band-shaped piece 43 or the second branched band-shaped piece 44 can be reduced, the width W1 (W2) with respect to the length L1 (L2) is not specifically limited. Note that 1≤W1 (W2)/L1 (L2)≤3 is preferred and 1≤W1 (W2)/L1 (L2)≤2 is more preferred. As compared to a typical technique, the first branched band-shaped piece 43 and/or the second branched band-shaped piece 44 have/has not only the effect of reducing deformation in response to force in the Z1 direction, but also the effect of reducing deformation in response to force in the X-direction and/or the Y-direction.

The cutout portion 45 is, at the side wall 41, provided closer to the fitting port 40 side than the coupling portion 42 is to the fitting port 40 side, and branches the first branched band-shaped piece 43 and the second branched band-shaped piece 44 from the side walls 41. The cutout portion 45 has a first cutout 451 arranged over one side wall 41*a* and the other side wall 41*b* and extending in the direction perpendicular to the fitting direction and a second cutout 452 extending from the first cutout 451 to the fitting port 40 in the same direction as the fitting direction. Since the first cutout 451 and the second cutout 452 communicate with each other, the branched band-shaped pieces 43, 44 can be branched from the side walls 41*a*, 41*b*. In the present embodiment, the first cutout 451 is, at the corner portion of the shell 4, provided over the side walls 41*a*, 41*b* adjacent to each other. The second cutout 452 is provided at the corner portion of the shell 4 provided with the branched band-shaped pieces 43, 44. The cutout portion 45 is provided closer to the fitting port 40 side than the lock hole 46 is to the fitting port 40 side. That is, the cutout portion 45 is provided at a position (the Z1 side) higher than the height position of the lock hole 46.

The lock hole 46 is a hole provided at the side wall 41 for locking the partner connector. When the partner connector is fitted, claws of the partner connector are fitted in the lock holes 46, and accordingly, the partner connector and the electric connector 1 can be engaged with each other. The lock holes 46 described herein are provided at center portions of the pair of side walls 41*b*.

The claw portions 47 are provided at the side walls 41, and are configured to contact the shell of the partner connector. In the present embodiment, the claw portion 47 has an opening 47*a* provided at a center portion of each of the side walls 41*a* in a pair and a claw 47*b*. The claw 47*b* extends upwardly from a lower edge of the opening 47*a*. A tip end of the claw 47*b* projects to the outside. The claws 47*b* contact the shell of the partner connector when the partner connector and the electric connector 1 are fitted in each other, and accordingly, the partner connector can be connected to the ground, for example.

The guide piece 48 stands at least on part of an upper edge of the side wall 41 forming the fitting port 40. The guide piece 48 is provided to extend outwardly from the fitting port 40. The guide pieces 48 guide the partner connector so that the partner connector can be easily fitted.

In the present embodiment, the rectangular tubular shell 4 can be produced in such a manner that a single long metal plate is bent multiple times. The shape of the fitting port 40 can be such a pentagonal shape that one corner of the rectangular shape is cut out in such a manner that the cutout portion 45 is formed by a cutting device before such a bending process and the branched band-shaped pieces 43, 44 are bent about the axis J after the bending process. A raised portion 49*a* projecting in the Z-direction on a tip end side is provided at one end portion of the single long metal plate, and a recessed portion 49*b* having the same shape as that of the raised portion 49*a* is provided at the other end portion. The raised portion 49*a* and the recessed portion 49*b* can be fitted in each other to form the shell 4.

Features and Advantageous Effects (1) The electric connector 1 of the present embodiment includes the housing 2 having the plate-shaped body 21, the multiple terminals 3 held on the plate-shaped body 21, and the metal shell 4 surrounding the plate-shaped body 21 and the terminals 3 and having the tubular shape. The shell 4 has the fitting port 40 in which the partner connector is to be fitted, the two or more side walls 41 provided along the partner connector fitting direction, the coupling portion 42 coupling adjacent ones 41*a*, 41*b* of the two or more side walls 41, and the first branched band-shaped piece 43 provided closer to the fitting port 40 side than the coupling portion 42 is to the fitting port 40 side. The first branched band-shaped piece 43 is bent about the axis J along the fitting direction from one 41*a* of the adjacent side walls 41*a*, 41*b*, and extends toward the other one 41*b* of the adjacent side walls 41*a*, 41*b*. The edge E of the first branched band-shaped piece 43 opposite to the coupling portion 42 forms part of the fitting port 40.

With this configuration, erroneous insertion of the partner connector can be reduced, and deformation of the shell 4 can be reduced. That is, the edge E of the first branched band-shaped piece 43 forms part of the fitting port 40. Thus, even when the partner connector of which shape does not match the shape of the fitting port 40 or the partner connector of which direction does not match the orientation of the fitting port 40 is about to be erroneously inserted, the partner connector can be blocked not by the surface of the first branched band-shaped piece 43 but by the edge E of the first branched band-shaped piece 43. Thus, damage or breakage of the terminal 3 due to erroneous insertion of the partner connector can be reduced.

Note that a typical electric connector has a bent piece standing in a fitting direction on a fitting port of a shell and bent such that a tip end portion thereof is perpendicular to the fitting direction. In such a typical electric connector, an erroneously-inserted partner connector is received by a surface of the bent piece forming the tip end portion. For this reason, deformation of the bent piece is easily caused. On the other hand, in the present embodiment, the first branched band-shaped piece 43 is bent about the axis along the partner connector fitting direction. Thus, force applied in the fitting direction is received by the edge E of the first branched band-shaped piece 43. With this configuration, the stiffness of the first branched band-shaped piece 43 or the entire shell 4 can be enhanced, and therefore, deformation of the shell 4 can be reduced.

(2) The width of the first branched band-shaped piece 43 as the length of the first branched band-shaped piece 43 in the fitting direction is equal to or greater than the length of the first branched band-shaped piece 43 from one side wall 41*a* toward the other side wall 41*b*. With this configuration, the stiffness of the first branched band-shaped piece 43 or the entire shell 4 can be enhanced, and therefore, deformation of the shell 4 can be reduced.

(3) The width of the first branched band-shaped piece 43 as the length of the first branched band-shaped piece 43 in the fitting direction is greater than the thickness of the first branched band-shaped piece 43. With this configuration, the stiffness of the first branched band-shaped piece 43 or the entire shell 4 can be enhanced, and therefore, deformation of the shell 4 can be reduced.

(4) The shell 4 further has the second branched band-shaped piece 44 provided closer to the fitting port 40 side than the coupling portion 42 is to the fitting port 40 side. The second branched band-shaped piece 44 is bent about the axis J along the fitting direction from the other one 41*b* of the adjacent side walls 41*a*, 41*b*, and extends toward the one 41*a* of the adjacent side walls 41*a*, 41*b*. The edge E of the second branched band-shaped piece 44 opposite to the coupling portion 42 forms part of the fitting port 40.

With this configuration, the length of each branched band-shaped piece can be shortened. Thus, the effect of reducing erroneous insertion of the partner connector can be improved. That is, the length of each branched band-shaped piece from any surface to the tip end can be shortened, and therefore, the moment of force in the fitting direction on the branched band-shaped piece when an attempt is made to forcibly fit the partner connector can be decreased. Thus, deformation of the shell 4 can be reduced.

(5) The clearance between the tip end of the first branched band-shaped piece 43 and the tip end of the second branched band-shaped piece 44 is equal to or smaller than the thickness of the first branched band-shaped piece 43 or the thickness of the second branched band-shaped piece 44. With this configuration, even when excessive force is applied to the edge E of the first branched band-shaped piece 43 or the second branched band-shaped piece 44 and either one of the first branched band-shaped piece 43 or the second branched band-shaped piece 44 is deformed, the deformed branched band-shaped piece contacts the other branched band-shaped piece. Thus, further deformation of the branched band-shaped piece can be reduced.

(6) The shell 4 further has the guide pieces 48 standing at the upper edges of the side walls 41 forming the fitting port 40 to extend to the outside of the fitting port 40. The first branched band-shaped piece 43 is provided closer to a coupling portion 42 side than the guide piece 48 is to the coupling portion 42 side. With this configuration, the partner connector can be guided to the fitting port 40.

(7) The shell 4 further has: the cutout portion 45 provided closer to the fitting port 40 side than the coupling portion 42 is to the fitting port 40 side at the side wall 41, the cutout portion 45 branching the first branched band-shaped piece 43 from the side wall 41; and the lock hole 46 provided at one side wall 41*a* or the other side wall 41*b* to lock the partner connector. The cutout portion 45 is provided closer to the fitting port 40 side than the lock hole 46 is to the fitting port 40 side. With this configuration, the stiffness of the shell 4 can be held, and therefore, deformation of the shell 4 can be reduced.

(8) The cutout portion 45 has the first cutout 451 arranged over one side wall 41*a* and the other side wall 41*b* and extending in the direction perpendicular to the fitting direction, and the second cutout 452 extending in the same direction as the fitting direction from the first cutout 451 to the fitting port 40. With this configuration, the first branched band-shaped piece 43 can be formed. Moreover, the second cutout is provided at the corner portion of the shell so that the first branched band-shaped piece 43 and the second branched band-shaped piece 44 can be formed.

Other Embodiments

The technique of the present disclosure is not limited to the above-described embodiment, and also includes other embodiments described below. Moreover, the technique of the present disclosure also includes combinations of all or some of the above-described embodiment and the other embodiments. Further, modifications including various omissions, replacements, and changes can be made to these embodiments without departing from the scope of the technique of the present disclosure, and these modifications are also included in the present disclosure.

Figure 6:
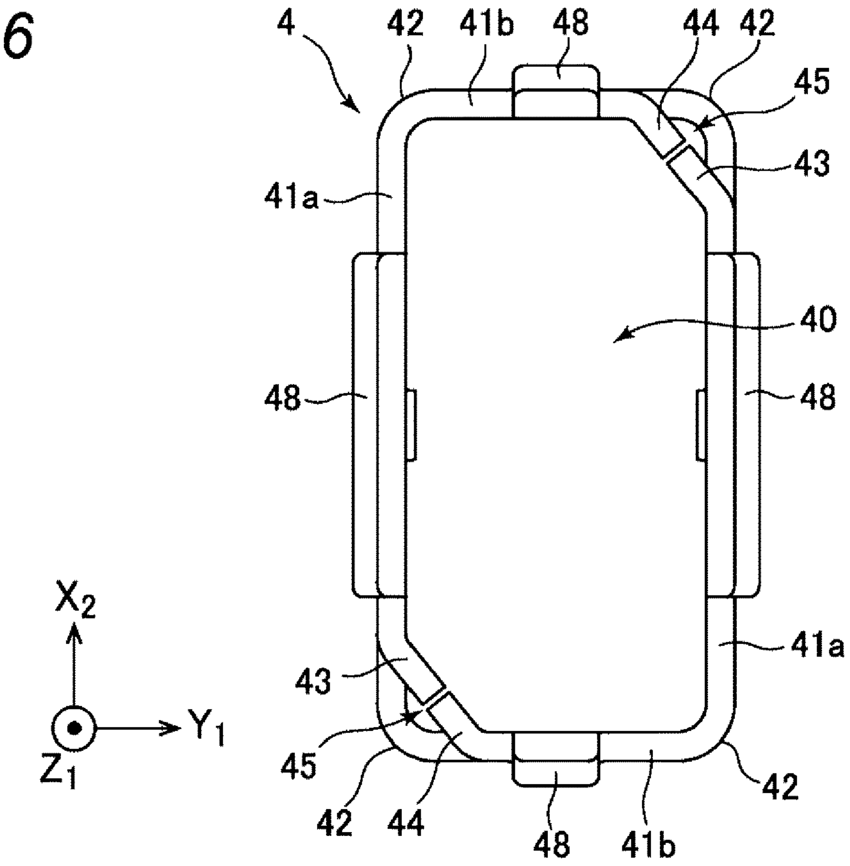
FIG. 6 is a top view of a shell according to a first variation of the embodiment.
Figure 7:
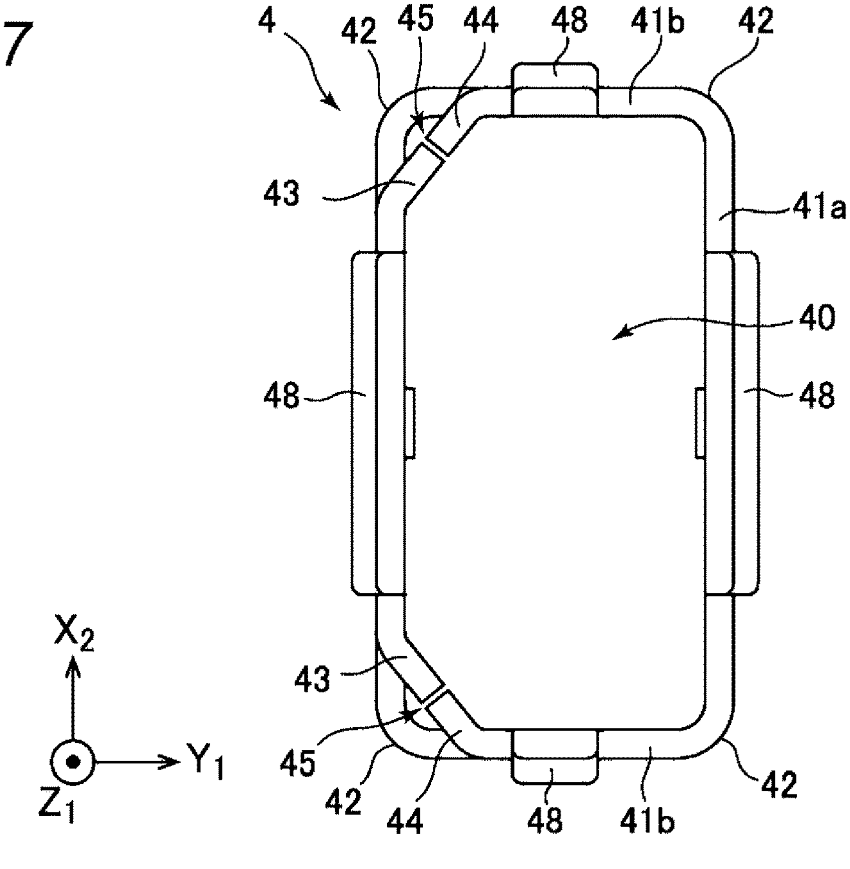
FIG. 7 is a top view of a shell according to a second variation of the embodiment.
Figure 8:
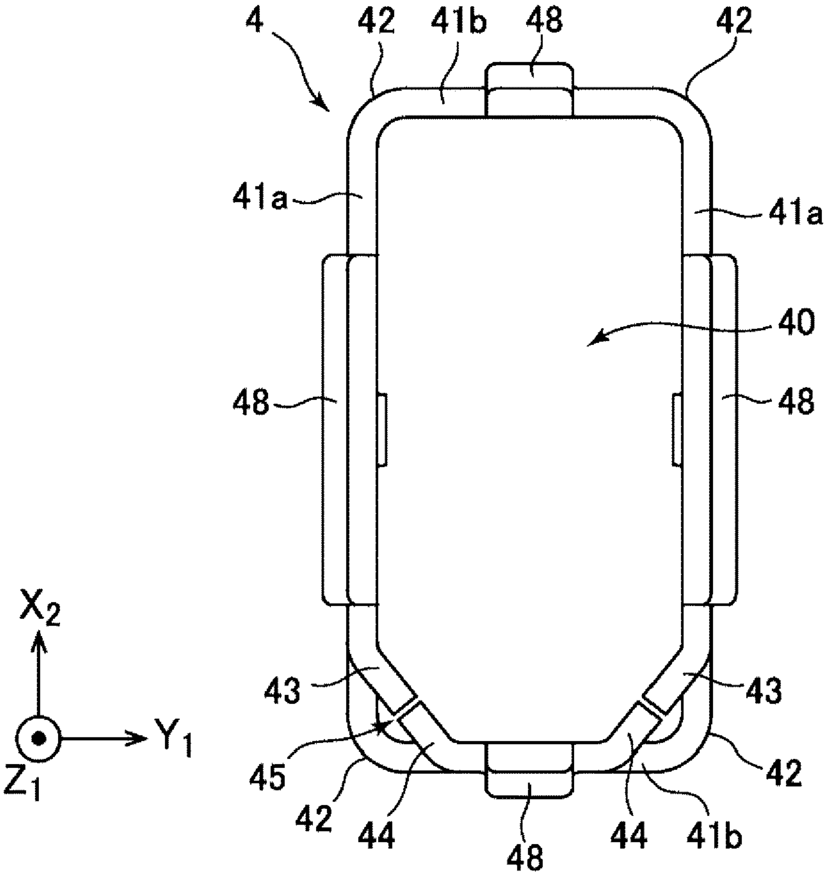
FIG. 8 is a top view of a shell according to a third variation of the embodiment.

For example, in the above-described embodiment, the group of the first branched band-shaped piece 43, the second branched band-shaped piece 44, the cutout portion 45, and the coupling portion 42 is provided at one corner portion of the shell 4. Instead, these groups may be provided at opposing corner portions of the shell 4 as shown in FIG. 6. Alternatively, the groups may be provided at corner portions positioned at both ends of the side wall 41*a* as shown in FIG. 7. Alternatively, the groups may be provided at corner portions positioned at both ends of the side wall 41*b* as shown in FIG. 8. As described above, the number of groups and/or the location of the group are optional.

Figure 9:
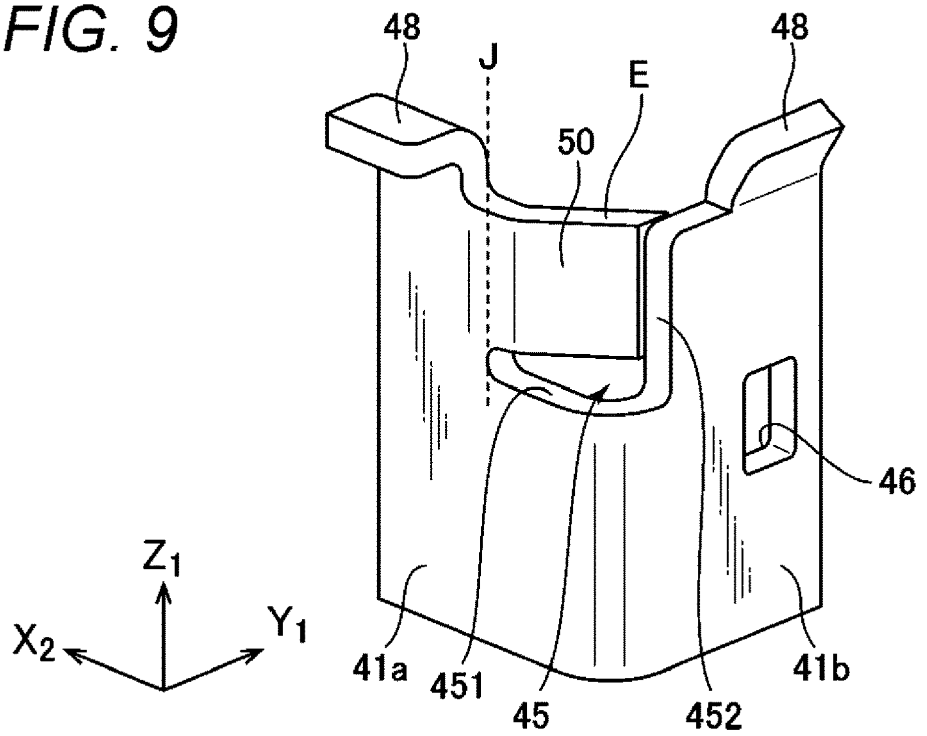
FIG. 9 is a partially-enlarged view of a corner portion of a shell according to a variation of the branched band-shaped piece, as viewed from the outside of the shell.
Figure 10:
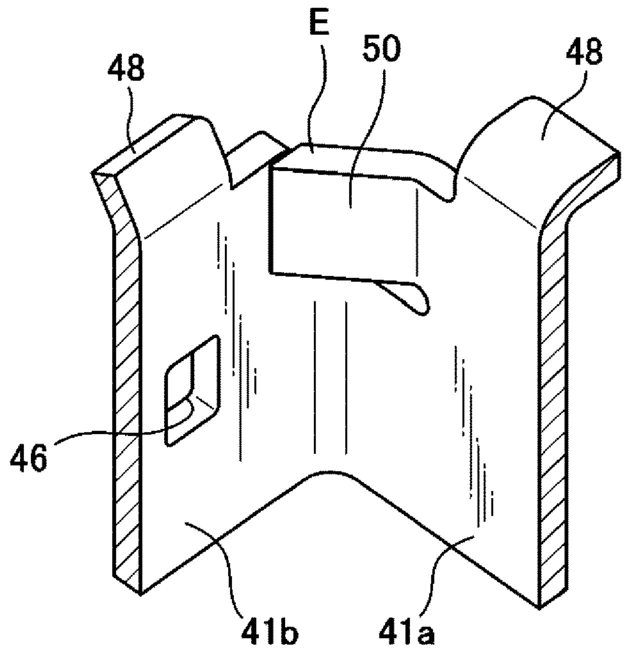
FIG. 10 is a partially-enlarged view of the corner portion of the shell according to the variation of the branched band-shaped piece, as viewed from the inside of the shell.
Figure 11:
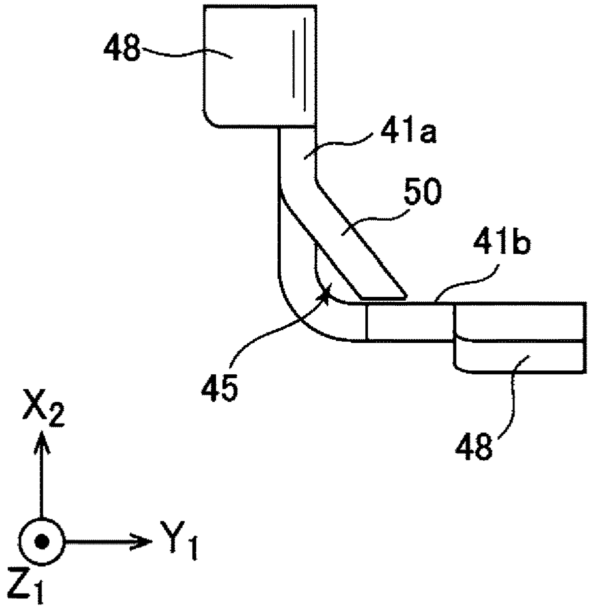
FIG. 11 is a partially-enlarged top view of the corner portion of the shell according to the variation of the branched band-shaped piece.

In the above-described embodiment, the two branched band-shaped pieces 43, 44 are provided. Instead, one branched band-shaped piece 50 may be provided. FIG. 9 is a partially-enlarged view of the corner portion of the shell 4 according to a variation of the branched band-shaped piece, as viewed from the outside of the shell 4. FIG. 10 is a partially-enlarged view of the corner portion of the shell 4 according to the variation of the branched band-shaped piece, as viewed from the inside of the shell 4. FIG. 11 is a partially-enlarged top view of the corner portion of the shell 4 according to the variation of the branched band-shaped piece. Hereinafter, the configurations of the branched band-shaped piece 50 and the cutout portion 45 different from those of the above-described embodiment will be described, and description of the same configuration will be omitted.

As shown in FIGS. 9 to 11, the single branched band-shaped piece 50 is provided, and extends from the side wall 41*a* until a tip end of the branched band-shaped piece 50 can contact the other side wall 41*b* adjacent to the side wall 41*a*. Even in such a configuration, erroneous insertion of the partner connector can be reduced, and deformation of the shell 4 can be reduced. Even in a case where the partner connector is forcibly inserted, the tip end of the branched band-shaped piece 50 contacts an inner surface of the side wall 41*b*, and therefore, deformation beyond such an inner surface can be reduced.

The length of the branched band-shaped piece 50 in an extending direction thereof may be equal to or greater than the width of the branched band-shaped piece 50, or may be smaller than the width of the branched band-shaped piece 50. The tip end of the branched band-shaped piece 50 is inclined along the side wall 41*b*. Thus, even in a case where the partner connector is forcibly inserted, the tip end of the branched band-shaped piece 50 surface-contacts the inner surface of the side wall 41*b*. Thus, stress on the branched band-shaped piece 50 upon erroneous insertion can be dispersed to the side wall 41*b* having a higher stiffness than that of the branched band-shaped piece 50. Consequently, deformation of the shell 4 can be reduced. Note that such inclination can be formed by, e.g., pressing.

The cutout portion 45 is different from that of the above-described embodiment in the position of the second cutout 452. That is, in the above-described embodiment, the second cutout 452 is provided in the upper-lower direction along the corner of the shell 4. On the other hand, the second cutout 452 of the present variation is provided in the upper-lower direction at the side wall 41*b*. Thus, the cutout portion 45 is in an L-shape, and branches the branched band-shaped piece 50 from the side wall 41.

In the above-described embodiment, the electric connector 1 is the receptacle connector. On this point, the electric connector 1 may be a plug connector.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electric connector comprising:
a housing having a plate-shaped body;
multiple terminals held on the plate-shaped body; and
a metal shell surrounding the plate-shaped body and the terminals and having a tubular shape,
wherein the shell has
a fitting port in which a partner connector is to be fitted,
two or more side walls provided along a partner connector fitting direction,
a coupling portion coupling adjacent ones of the two or more side walls, and
a first branched band-shaped piece provided closer to a fitting port side than the coupling portion is to the fitting port side,
the first branched band-shaped piece is bent about an axis along the fitting direction from one of the adjacent ones of the two or more side walls, and extends toward another one of the adjacent ones of the two or more side walls,
an edge of the first branched band-shaped piece opposite to the coupling portion forms part of the fitting port,
the shell further has a second branched band-shaped piece provided closer to the fitting port side than the coupling portion is to the fitting port side,
the second branched band-shaped piece is bent about the axis along the fitting direction from the other one of the adjacent ones of the two or more side walls, and extends toward the one of the adjacent ones of the two or more side walls, and
an edge of the second branched band-shaped piece opposite to the coupling portion forms part of the fitting port.

2. The electric connector according to claim 1, wherein
a width of the first branched band-shaped piece in the fitting direction is equal to or greater than a length of the first branched band-shaped piece from the one of the adjacent ones of the two or more side walls toward the other one of the adjacent ones of the two or more side walls.

3. The electric connector according to claim 1, wherein a width of the first branched band-shaped piece in the fitting direction is greater than a thickness of the first branched band-shaped piece.

4. The electric connector according to claim 1, wherein
a clearance between a tip end of the first branched band-shaped piece and a tip end of the second branched band-shaped piece is equal to or smaller than the thickness of the first branched band-shaped piece or a thickness of the second branched band-shaped piece.

5. The electric connector according to claim 1, wherein
the shell further has a guide piece standing at an upper edge of at least one of the side walls forming the fitting port to extend to an outside of the fitting port, and
the first branched band-shaped piece is provided closer to a coupling portion side than the guide piece is to the coupling portion side.

6. The electric connector according to claim 1, wherein
the shell further has
a cutout portion provided closer to the fitting port side than the coupling portion is to the fitting port side at least at one of the side walls, the cutout portion branching the first branched band-shaped piece from the side wall, and a lock hole provided at the one or the other one of the adjacent ones of the two or more side walls to lock the partner connector, and the cutout portion is provided closer to the fitting port side than the lock hole is to the fitting port side.

7. The electric connector according to claim 6, wherein the cutout portion has a first cutout arranged over the one and the other one of the adjacent ones of the two or more side walls and extending in a direction perpendicular to the fitting direction, and a second cutout extending in a direction identical to the fitting direction from the first cutout to the fitting port.

* * * * *